US011215305B2

(12) United States Patent
Reuter et al.

(10) Patent No.: US 11,215,305 B2
(45) Date of Patent: Jan. 4, 2022

(54) CONNECTOR AND CONNECTOR ASSEMBLY AND METHOD FOR PRODUCING A CONNECTOR

(71) Applicants: Sven Reuter, Alzenau (DE); Fabian Herrmann, Obertshausen (DE)

(72) Inventors: Sven Reuter, Alzenau (DE); Fabian Herrmann, Obertshausen (DE)

(73) Assignee: Norma Germany GmbH, Maintal (DE)

( * ) Notice: Subject to any disclaimer, the term of this patent is extended or adjusted under 35 U.S.C. 154(b) by 230 days.

(21) Appl. No.: 16/341,747

(22) PCT Filed: Oct. 11, 2017

(86) PCT No.: PCT/EP2017/075912
§ 371 (c)(1),
(2) Date: Apr. 12, 2019

(87) PCT Pub. No.: WO2018/069384
PCT Pub. Date: Apr. 19, 2018

(65) Prior Publication Data
US 2020/0049290 A1 Feb. 13, 2020

(30) Foreign Application Priority Data
Oct. 14, 2016 (DE) .......................... 102016119659.2

(51) Int. Cl.
*F16L 37/088* (2006.01)
(52) U.S. Cl.
CPC ................ *F16L 37/0885* (2019.08)

(58) Field of Classification Search
CPC . F16L 37/088; F16L 37/0885; F16L 37/0887; F16L 27/0808; F16L 27/0804; F16L 27/0837; F16L 27/0845
(Continued)

(56) References Cited

U.S. PATENT DOCUMENTS 3,453,005 A 7/1969 Foults
3,922,011 A * 11/1975 Walters ............... F16L 37/0885
285/277

(Continued)

FOREIGN PATENT DOCUMENTS

CN 101876387 A 11/2010
DE 10017679 C1 9/2001
(Continued)

OTHER PUBLICATIONS

Korean Office Action for Korean Application No. 10-2019-7013615 dated Jul. 1, 2020 (9 pages).
(Continued)

*Primary Examiner* — Aaron M Dunwoody
(74) *Attorney, Agent, or Firm* — Reising Ethington, P.C.

(57) ABSTRACT

In a connector for a fluid line having a connector housing which has a fluid duct extending away from a first opening, a locking device having a locking housing and a locking element is provided in the region of the first opening. The locking housing encloses the connector housing with respect to the fluid duct such that an annular gap which is intended for receiving a substantially cylindrical connection piece is formed between the connector housing and the locking housing. The locking housing has a cutout through which the locking element projects into the annular gap by way of a respective holding portion.

14 Claims, 3 Drawing Sheets

(58) Field of Classification Search
USPC .................................. 285/280, 281, 321
See application file for complete search history.

(56) References Cited

U.S. PATENT DOCUMENTS

| | | |
|---|---|---|
| 8,336,919 B2 | 12/2012 | Gillet et al. |
| 2013/0140808 A1 | 6/2013 | Bongiorni et al. |
| 2014/0070531 A1 | 3/2014 | Inoue et al. |

FOREIGN PATENT DOCUMENTS

| | | |
|---|---|---|
| DE | 102011118790 A1 | 5/2013 |
| JP | 2001295975 A | 10/2001 |
| JP | 2012211684 A | 11/2012 |
| KR | 20140008346 A | 1/2014 |

OTHER PUBLICATIONS

English Translation of Korean Office Action for Korean Application No. 10-2019-7013615 dated Jul. 1, 2020 (9 pages).
Chinese Office Action for Chinese Application No. 201780062319.9 dated May 14, 2020 (7 pages).
English Translation of Chinese Office Action for Chinese Application No. 201780062319.9 dated May 14, 2020 (8 pages).
First German Office Action for Application No. 102016119659.2 dated Mar. 29, 2017 (5 pages).
International Search Report for Application No. PCT/EP2017/075912 dated Jan. 16, 2018 (3 pages).
English Translation of International Search Report for Application No. PCT/EP2017/075912 dated Jan. 16, 2018 (2 pages).
Japanese Office Action for Japanese Application No. 2019-520382 dated Jul. 7, 2020 (7 pages).
English Translation of Japanese Office Action for Japanese Application No. 2019-520382 dated Jul. 7, 2020 (15 pages).

* cited by examiner

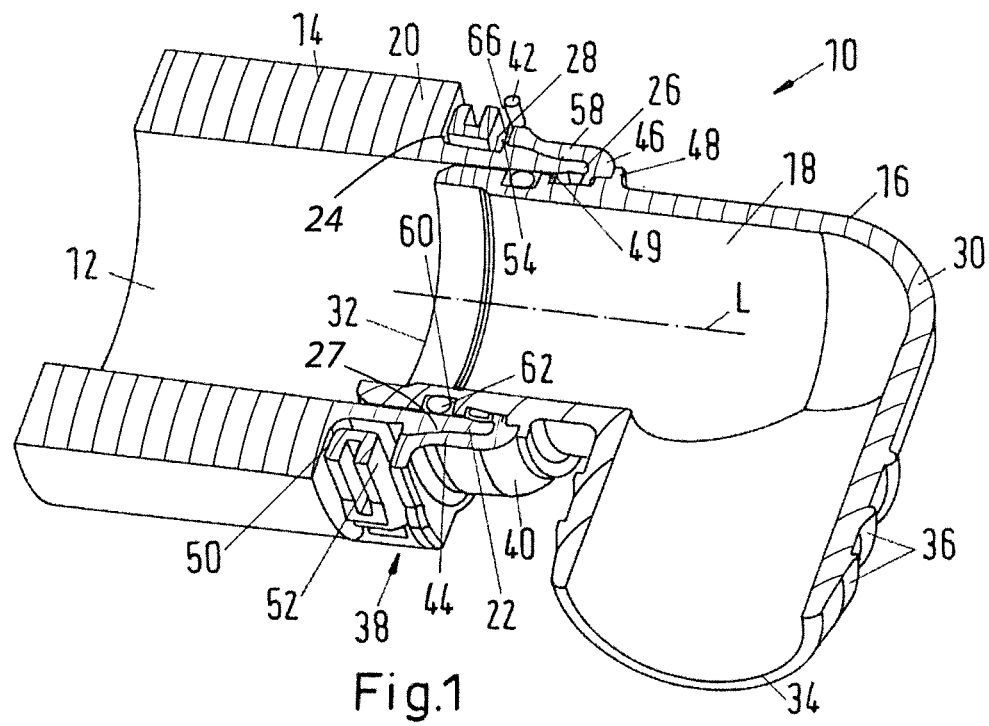

CONNECTOR AND CONNECTOR ASSEMBLY AND METHOD FOR PRODUCING A CONNECTOR

INTRODUCTION

The disclosure relates to a connector for a fluid line and to a connecting assembly comprising such a connector and a connecting branch. The disclosure additionally relates to a method for producing a connector.

The connection of pipes, hoses, connecting branches or other fluid lines is common, for example, in the automotive industry, the utilities industry or in ventilation engineering. The connection is realized with a connector which can be connected in a fluid-tight manner, for instance, to a fluid line on the one hand and to a connecting branch on the other hand.

Such connections oftentimes must meet defined requirements, for instance in terms of their compressive strength, leak tightness, temperature resistance and/or mechanical stability. These requirements can be important in terms of the safety of an installation, in particular when such connections are used, for instance, for the connection of fuel tanks or in cooling water circuits of motor vehicles. Furthermore, easy handling of the connector is desired in order to shorten the assembly time and avoid instances of incorrect assembly.

One object of the disclosure is to provide a connector for connecting a fluid line to a connecting branch, which connector enables a quick and easy assembly and meets enhanced requirements regarding the compressive strength and leak-tightness of the connection. One object of the disclosure is additionally to provide a connector assembly comprising such a connector and a connecting branch, which connector assembly enables a rapid and reliable connection of the connector to the connecting branch, and a method for producing a connector.

In a connector for a fluid line comprising a connector housing which has a fluid duct extending away from a first opening, a locking device having a locking housing and a locking element is provided in the region of the first opening. The locking housing encloses the connector housing with respect to the fluid duct in the peripheral direction such that an, in particular peripherally circumferential, annular gap, which is open to the first opening, is formed between the connector housing and the locking housing in order to receive a substantially cylindrical connecting branch. The locking element juts with at least one holding portion in an elastically resilient manner into the annular gap. The locking housing is a component which is separate from the connector housing and which, at least in the longitudinal direction of the fluid duct, is fixed to the connector housing in the region of the first opening.

The connector thus consists of at least three components, a connector housing and at least one locking device respectively comprising a locking housing and a locking element. Since the locking device, in particular the locking housing, is not part of the connector housing, it can be produced separately, whereby the production of the individual parts is simpler. Moreover, the locking device can be separately adapted and dimensioned to the respectively needed requirements. In particular, the locking device can be produced from other materials than the connector housing, so that a further adaptation to the generated loads or the desired requirements, for instance a weight reduction, can be made.

The annular gap and the locking device can be configured such that a slipping-on and fixing of the connector onto previously used connecting branches which have a holding geometry, such as a depression for the reception of, and/or a circumferential collar for the application of, the holding portion of the locking element is possible.

The connection of the locking housing can be realized differently. For instance, the locking housing is fixed to the connector housing via a positive and/or integrally bonded connection. A positive connection can be realized, for instance, by interacting projections or flanges on the locking housing and on the connector housing. For instance, the projections or flanges are configured protruding radially outward or radially inward. By such a connection, the locking housing and the connector housing are fixed to one another, for instance, only in the longitudinal direction, so that a rotation of the locking housing, for instance for the alignment of the locking housing to a connecting branch, is possible.

The connection can be a latching mechanism, wherein on the locking housing or on the connector housing are provided latching lugs, and on the connector housing or on the locking housing are provided latching projections onto which the latching lugs latch in the longitudinal direction. Such a latching mechanism enables a toolless fastening of the locking housing to the connector housing, so that the assembly of the connector is simplified. The latching projections can be formed by a peripherally circumferential flange.

In addition, means for securing the locking housing to the connector housing in the peripheral direction can be provided, so that the alignment of the locking device on the connector housing is secured. In particular, the means can be formed by tooth systems which are provided on the locking housing and on the connector housing and which, for instance, intermesh when the locking housing is fitted on the connector housing.

The locking housing can have at an end facing away from the first opening of the fluid duct a radially inwardly jutting collar, which, in particular, is fixed to the connector housing. The collar closes the annular gap in the longitudinal direction and thus forms, for instance, a stop for the connecting branch, so that the latter can be inserted only to the point where the holding geometry is located before the recesses and the holding portions of the locking element can cooperate with the holding geometry.

The annular gap can have transversely to the longitudinal direction a constant width. It is also possible, however, for the annular gap to at least in part taper, in the longitudinal direction of the fluid duct, away from the first opening. For instance, a portion directly adjoining the first opening can taper, whereby an inlet guide for the connecting branch is formed. It is also possible, however, for the annular gap to taper in the region of the bottom of the annular gap. The connecting branch can be clamped and/or centered upon insertion into the tapering portion.

Preferably, that inner side of the locking housing that is facing toward the connector housing is at least in part configured such that it tapers conically away from the first opening. The connector has, for instance, a constant external diameter, whereby this is easy to produce. The conical shape of the annular gap is provided only by the shape of the locking housing to be separately produced.

The connector housing is, for instance, of cylindrical configuration, and the locking element of annular configuration. The connecting branch is likewise of cylindrical configuration. As a result, the connector can be slipped in the longitudinal direction onto the connecting branch in any chosen orientation with the annular gap. A desired orientation can be established during, or else after the slipping-on, by rotation of the connector about the longitudinal axis. In particular in the case of an angularly configured connector, the fitting of the connector on the connecting branch is thereby simplified.

On the outer side of the connector housing is preferably provided at least one radially outwardly protruding seal, running in the peripheral direction around the connector housing, in order to seal the connector and the connecting branch one against the other. The seal is arranged in the annular gap and thus securely protected even when the connecting branch is not inserted. In particular, the seal is arranged in a peripherally circumferential groove, so that a displacement in the longitudinal direction is securely prevented.

The opening-side end of the connector housing can lie in one plane with the first opening of the connector. These lie, however, in different planes, so that the opening-side end or the first opening of the connector projects in the longitudinal direction, whereby the insertion of the connecting branch could be simplified.

The locking element is preferably a clamp, which at least in part encloses the locking housing in the peripheral direction and juts with the at least one holding portion from a radial outer side into the annular gap. The clamp lies, for instance, in a peripherally running groove, in which the clamp is securely held. In particular, the locking element can be a metal clamp, which is easy to produce and has a long working life.

For instance, the locking element is movable between an assembly position, in which the at least one holding portion does not engage in the annular gap or engages therein only to the point where it does not cooperate with the holding geometry of the connecting branch, and a locking position, in which the at least one holding portion engages in the annular gap.

The locking element has at least two holding portions, which are arranged, in particular, evenly distributed in the peripheral direction. The connector is held on the connecting branch such that it is evenly distributed in the peripheral direction, so that a tilting of the connector, for instance under a tensile force acting eccentrically on the connector, is prevented.

The holding portions, in particular the entire locking element, can be movable between an assembly position, in which the holding portions do not jut into the annular gap, and a locking position, in which the holding portions do jut into the annular gap. For instance, on the locking housing can be provided ramps or guide means, which, upon a movement from the locking position into the assembly position, force the holding portions out of the annular gap, whereby the fixing of the connecting branch is lifted and the connector can be easily disconnected from the connecting branch. The locking element can be moved between the assembly position and the locking position without tools.

In particular, the locking clamp can be configured symmetrically, for instance in mirror image with respect to a plane of symmetry perpendicular to the longitudinal axis or in point symmetry with respect to the longitudinal axis.

The connecting housing can be, for instance, a stopper, by which the connecting branch is sealed.

The fluid duct from extend, however, also from the first opening to a second opening. At the second opening a receiving geometry for a pipeline, or some other component for the continuation of the fluid duct, can be provided. The receiving geometry can have a Christmas tree structure or some other suitable structure for the reception and fixing of a pipeline. Alternatively, a locking device can be provided also at the second opening.

There is further provided a connector assembly for a fluid line, comprising a previously described connector and comprising a connecting branch which has a peripherally circumferential connector portion, wherein the connector portion juts into the annular gap and has at least one holding geometry, which cooperates with the at least one holding portion of the locking element and fixes the connector and the connecting branch, at least in the longitudinal direction of the fluid duct, relative to one another.

The connector is slipped with the annular gap onto the connecting branch. After this, the connector is fixed to the connecting branch by an engagement of the at least one holding portion with the holding geometry. A removal of the connector is possible by a movement of the holding portion counter to the spring force and out of engagement with the holding geometry, whereby the connector is no longer fixed to the connecting branch and can be disconnected therefrom in the longitudinal direction.

The holding geometry can be of peripherally circumferential configuration, in the form of a depression or a collar, so that the connector can be placed in any chosen orientation onto the connector portion.

The free end of the connector portion can be configured such that it tapers toward the free end, wherein in particular the outer face of the free end is likewise of tapered configuration.

There is further provided a method for producing an above-described connector, which method comprises the following steps:
 a) provision of a connector housing,
 b) provision of a locking device having a locking housing and a locking element,
 c) integrally bonded and/or positive connection of the locking housing to the connector housing, so that a peripherally circumferential annular gap, which is open to the first opening, is formed between the connector housing and the locking housing in order to receive a substantially cylindrical connecting branch.

Since the components of the connector are produced individually, a simpler production of the connector is possible. In particular, the individual components can be more easily produced, since the individual components respectively have a simpler geometry and, in particular, have fewer undercuts and recesses. Furthermore, for the individual components respectively different materials can be used, so that the individual components can be better adapted to the respective load.

Following the connection of the locking housing to the connector housing, on the connector housing a radially outwardly protruding seal, running in the peripheral direction around the connector housing, is arranged in the annular gap, wherein the seal is arranged, in particular, in a peripherally circumferential groove.

BRIEF DESCRIPTION OF THE FIGURES

Further features, details and advantages of the disclosure emerge from the wording of the claims and from the following description of an illustrative embodiment with reference to the drawings, wherein:

FIG. 1 shows a first sectional view through a connector assembly according to an embodiment;

FIG. 2 shows a second sectional view through the connector assembly from FIG. 1;

DETAILED DESCRIPTION

Figure 3:
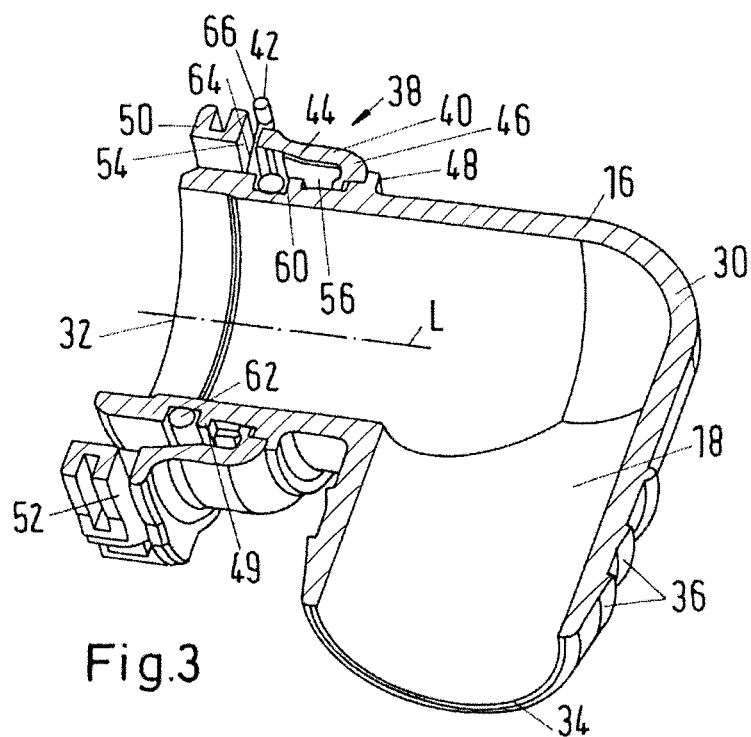
FIG. 3 shows a sectional view through the connector of the connector assembly from FIG. 1.

In FIGS. 1 and 2 is shown a connector assembly 10 for a fluid line 12 comprising a connecting branch 14 and a connector 16, which latter is shown in detail in FIGS. 3 to 6. The fluid line 12 extends from the connecting branch 14 through a fluid duct 18 formed in the connector 16 and a pipeline (not represented here) fastened to the connector 16.

The connector assembly 10 is used for instance in the automotive sector, in particular for commercial vehicles, for the transport of gaseous or liquid pressurized fluids. However, there are also other possible application, in which a fluid line 12 for an, in particular pressurized, fluid is necessary.

The connecting branch 14 has a main body 20 and a connector portion 22, which is of substantially cylindrical configuration. The connecting branch 14 has at the transition to the connector portion 22 a circumferential shoulder 24, which protrudes radially with respect to the longitudinal axis of the connector portion and which is formed by an outer face of the connecting branch 14. The free end 26 of the connector portion 22 has an outer side 27 which is tapered toward the free end 26. Between the tapered portion and the shoulder 24 is provided a holding geometry 28, which runs circumferentially in the peripheral direction with respect to the longitudinal direction L and is configured as a groove.

The connector 16 has a connector housing 30, in which the fluid duct 18 extends between a first opening 32 and a second opening 34. Those portions of the connector housing 30 and of the fluid duct which adjoin the openings 32, 34 are of rectilinear configuration for insertion into the connecting branch 14. In the shown embodiment, the connector housing 30 is configured such that the fluid duct 18 kinks and the planes of the first opening 32 and of the second opening 34 are arranged substantially at a right angle to one another. However, other courses of the fluid duct 18 are also possible. In particular, the fluid duct 18 can also run in a rectilinear or curved course. The connector housing 30 can also be configured such that the course of the fluid duct 18 can be adapted, for instance, by the connector housing 30 having a flexible portion or a hinged joint.

The connector 16 can connect the connecting branch 14 to another component which continues the fluid line 12, for instance a pipeline, a hose or a further connecting branch. Alternatively, embodiments of a connector 16 having just one opening 32 are also possible, which opening is mounted onto the connecting branch 14. In such an embodiment, the connector 16 serves as a stopper for the sealing of the connecting branch 14.

In the region of the second opening 34, a receiving geometry 36 for a pipeline, for instance a flexible line, is provided, which receiving geometry, in the embodiment which is shown here, is formed by a Christmas tree structure. The line is slipped onto the receiving geometry 36 and fixed thereon, for instance by an additional holding element, such as a clamping collar.

At the first opening 32, a locking device 38 is provided in order to fix the connector 16 to the connecting branch 14.

The locking device 38 has a substantially annularly configured locking housing 40, and a locking element 42, which is configured as a clamp.

The locking housing 40 has a substantially cylindrical region 44, and, at the end facing away from the first opening 32, a radially inwardly jutting collar 46, with which the locking housing 40 bears against the connector housing 30. On the connector housing 30 is provided at least one circumferential projection 48, against which the collar 46 bears, so that the position of the locking housing 40 in the longitudinal direction L of the fluid duct 18 is defined by form closure on the connector housing 30. On the locking housing 40 or on the connector housing 30 are provided, for instance, latching lugs, and on the connector housing 30 or on the locking housing 40 latching projections, onto which the latching lugs latch in the longitudinal direction L, wherein the latching projections are formed, in particular, by a peripherally circumferential flange 49.

In the peripheral direction, the locking housing 40 is rotatable relative to the connector housing 30. The cylindrical region 44 of the locking housing 40 encloses the connector housing 30 in the region of the opening 32, in particular concentrically. Optionally, means can also be provided to secure the locking housing 40 in the peripheral direction to the connector housing 30, for instance axial protruding, interacting tooth systems on the locking housing 40 and on the connector housing 30.

On the cylindrical region 44 is provided a peripherally circumferential receptacle 52 of groove-like configuration, which has a plurality of recesses 54 arranged distributed in the peripheral direction.

The locking housing 40 is fixed in such a way to the connector housing 30 that between the connector housing 30 and the locking housing 40 is formed an annular gap 56, which extends away from the first opening up to the collar 46 and runs in the peripheral direction around the connector housing 30 and which serves to receive an end of the connecting branch 14. The annular gap 56 tapers in the longitudinal direction L of the fluid duct 18 away from the first opening 32, wherein that inner side of the locking housing 40 that is facing toward the connector housing 30 is configured, on a portion 58 adjacent to the collar 46, such that it tapers conically away from the first opening 32. In the annular gap 56 is provided on the connector housing 30 a groove 60, in which is arranged a peripherally circumferential seal 62 protruding radially outward over the outer face of the connector housing 30.

The locking element 42 configured as a clamp is arranged in the receptacle 52 and has a plurality of holding portions 64, which jut in an elastically resilient manner into the annular gap 56. Between the holding portions 64 are provided connecting portions 66, which jut through the recesses 54 out of the annular gap 56. The clamp is made, for instance, of metal or some other elastically deformable material. The holding portions 64 are spring-loaded into the annular gap 56 and can preferably be moved counter to the spring force out of the annular gap 56.

The locking element 42 is configured, for instance, symmetrically. In the embodiment which is shown here, the locking element 42 is configured in mirror image with respect to a plane of symmetry arranged perpendicular to the longitudinal direction L. However, it is also possible for the locking element 42 to be configured in point symmetry with respect to the longitudinal direction L.

For instance, on the locking housing 40 are provided an assembly position and a locking position for the locking element 42. In the assembly position, the holding portions 64 do not jut, into the annular gap 56, or jut into this only to the point where they disengage from the holding geometry 28 of the connecting branch 14. In the locking position, the holding portions 64 do jut into the annular gap 56. On the locking housing 40 are provided ramps, which, upon a movement of the locking element 42 from the locking position into the assembly position, force the holding portions 64 out of the annular gap 56. For instance, a tool can be applied to an at least one connecting portion 66 in order to move the locking element 42 from the locking position into the assembly position, or at least one or more holding portions 64 out of the annular gap 56.

For the assembly of the connector assembly 10, the connector portion 22 of the connecting branch 14 is inserted into the annular gap 56. The holding portions 64 of the locking element 42 here do not jut obstructively into the annular gap 56 and, if need be, can be moved radially outward through the connecting branch 14. The tapered faces of the connector portion 22 aid this. The seal 62 bears in the peripheral direction circumferentially against the inner face of the connector portion 22, centers the connector 16 on the connecting branch 14 and seals the connector 16 against the connecting branch 14. As can be seen in FIG. 1, the holding geometry 28 is located with respect to the longitudinal direction L in the radial direction between the recesses 54 of the locking housing 40. After this, the holding portions 64 of the locking element 42 can be moved into the recess 54, so that these into the annular gap 56 and cooperate with the holding geometry 28 and prevent a withdrawal of the connector portion 22 from the annular gap 56.

Since the holding geometry 28 is of circumferential configuration, the connector, for alignment of the second opening 34, can be rotated about the longitudinal direction L. Furthermore, the locking housing 40, at least prior to the fitting of the locking housing 40 on the connector housing 30, can be rotated or aligned, for instance in order to improve the accessibility of the locking element 42. If, on the connector portion 22 of the connecting branch 14, only individual holding geometries for the holding portions 64 of the locking element 42 are provided, an alignment of the recesses 54 to the holding geometries is possible, moreover, by rotation of the locking housing 40, wherein the locking housing 40 can be aligned independently of the connector housing 30.

For the release of the connection, the locking element 42 can be moved into the assembly position, whereby the holding portions 64 are moved radially outward and the connector portion 22 is not fixed by these in the longitudinal direction L. For this purpose, ends of the locking element 42 can be guided on ramps, which, upon the withdrawal of the locking element 42, effect a radial expansion.

Figure 4:
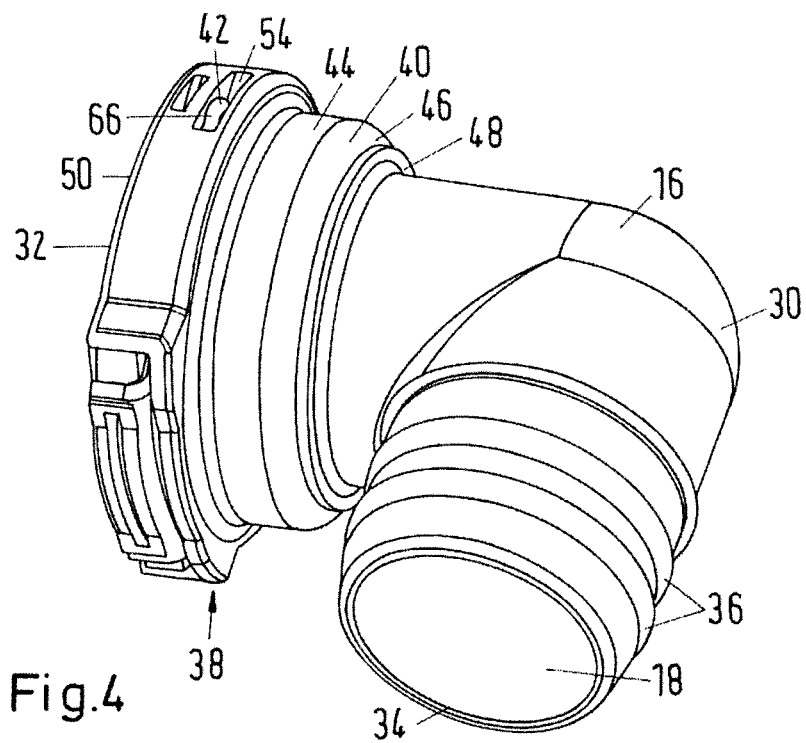
FIG. 4 shows a first perspective view of the connector of the connector assembly from FIG. 1.
Figure 5:
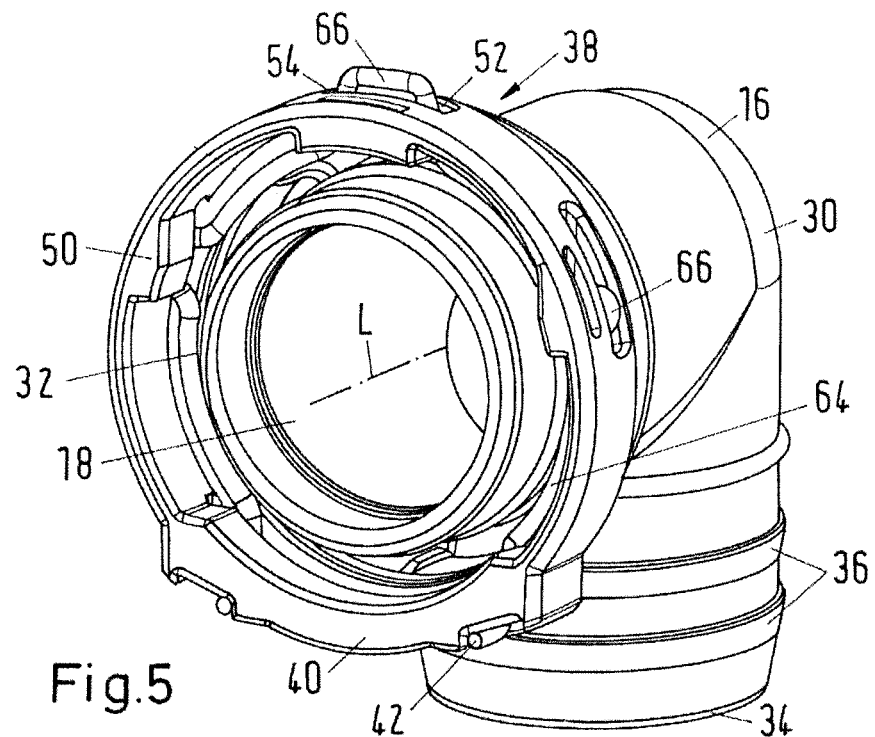
FIG. 5 shows a second perspective view of the connector of the connector assembly from FIG. 1.
Figure 6:
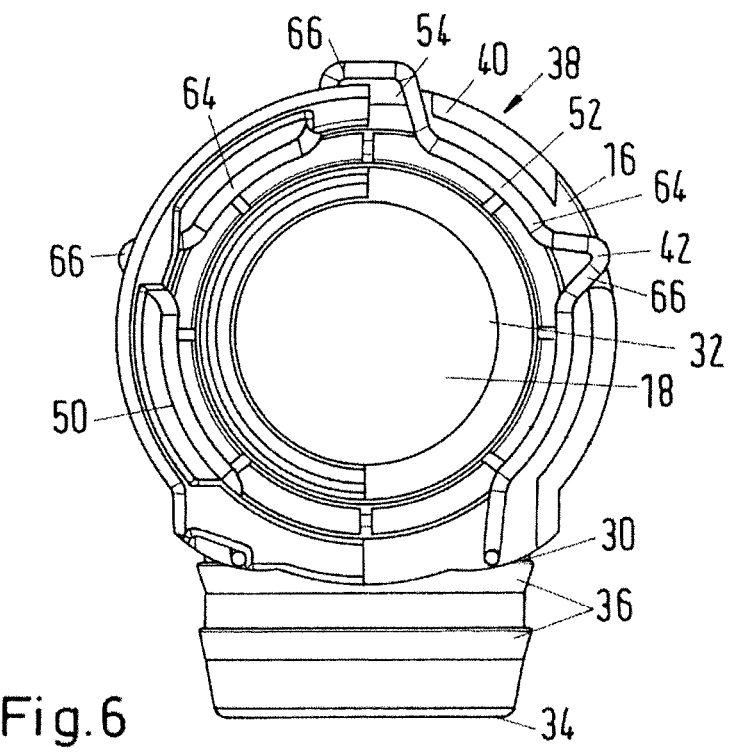
FIG. 6 shows a third perspective view of the connector of the connector assembly from FIG. 1.

As can be seen in FIGS. 3 and 4, on the opening-side end 50 of the locking housing 40 are provided radially inwardly jutting reinforcements, against which the locking element 42 bears, in particular with the connecting portions 66, in the longitudinal direction L. The reinforcements improve the stability of the locking housing 40, so that a better load transmission from the locking element 42 to the locking housing 40 is realized. Irrespective there thereof, the opening-side end 50 can be of any chosen design as long as a sufficient force transmission between the locking element 42 and the locking housing 40 is ensured. For instance, on the connecting branch 14 and on the locking housing 40 could also be provided interacting geometries or elements, which prevent or limit twisting of the locking housing 40 relative to the connecting branch 14 or which, for instance, if a plurality of connecting branches 14 and a plurality of different connectors 16 are provided for different fluids, ensure that a connector 16 can be placed only onto specific connecting branches 14.

The invention is not limited to one of the embodiments described above, but is modifiable in a variety of ways.

For instance, the locking housing 40 on the connector housing 30 can be fixed, according to choice, in a positive and/or integrally bonded manner to the connector housing 30, as long as a fixing is realized at least in the longitudinal direction L of the fluid duct 18.

By virtue of the conically tapering portions, a better clamping effect between the locking device 38 and the connector portion 22 can be achieved. Moreover, such conical portions facilitate the introduction of the connector portion 22. However, embodiments without tapering portions are also possible.

Nor do the locking housing 40 and the first opening 32 have to lie in one plane. It is also possible for the locking housing 40 or the first opening 32 to protrude over the respectively other.

In particular, at both openings 32, 34, locking devices 38 can also be provided.

In an alternative embodiment, the holding portions 64 can already prior to assembly jut into the annular gap 56 and, upon the insertion of the connector portion 22, are forced radially outward by a tapered portion. Once the connector portion 22 is fully inserted in the annular gap 56, the holding portions 64 can spring back into the holding geometry, then situated at the height of the holding portions 64, in the form of depressions, and engage in these. For the removal of the connector assembly 10, there is further provided an assembly position of the locking element 42, in which the holding portions 64 do not jut into the annular gap 56. If need be, the locking element 42 can here be held in the assembly position, by application of an external force, until the connecting branch is withdrawn from the annular gap. If this force is removed or absent, the locking element then moves, in particular independently, back again into the locking position.

All features and advantages emerging from the claims, the description and the drawing, inclusive of design details, spatial arrangements and method steps, can be fundamental to the invention both individually and in a wide variety of combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

| Reference symbol list | |
|---|---|
| 10 | connector assembly |
| 12 | fluid line |
| 14 | connecting branch |
| 16 | connector |
| 18 | fluid duct |
| 20 | main body |
| 22 | connector portion |
| 24 | shoulder |
| 26 | free end |
| 27 | tapered outer side |
| 28 | holding geometry |
| 30 | connector housing |
| 32 | first opening of the connector housing |
| 34 | second opening of the connector housing |
| 36 | receiving geometry |
| 38 | locking device |
| 40 | locking housing |
| 42 | locking element |
| 44 | cylindrical region |
| 46 | collar |
| 48 | projection |
| 49 | flange |
| 50 | opening-side end of the locking housing |
| 52 | receptacle |
| 54 | recess |
| 56 | annular gap |
| 58 | conically tapering portion |
| 60 | groove |
| 62 | seal |
| 64 | holding portion |
| 66 | connecting portion |
| L | longitudinal direction of the fluid duct |

The invention claimed is:

1. A connector for a fluid line comprising a connector housing which has a fluid duct extending away from a first opening, wherein a locking device having a locking housing and a locking element is provided in a region of the first opening, wherein the locking housing encloses the connector housing in the region of the first opening with respect to the fluid duct in a peripheral direction such that an annular gap, which surrounds the first opening concentrically, is formed between the connector housing and the locking housing in order to receive a substantially cylindrical connecting branch, and wherein the locking element juts with at least one holding portion in an elastically resilient manner into the annular gap, wherein the locking housing is a component which is separate from the connector housing and which, at least in a longitudinal direction (L) of the fluid duct, is held on the connector housing in the region of the first opening, and wherein on an outer side of the connector housing is provided at least one radially outwardly protruding seal, running in the peripheral direction around the connector housing, wherein the seal is arranged in the annular gap, wherein the seal is arranged in a peripherally circumferential groove.

2. The connector as claimed in claim 1, wherein the locking housing is fixed to the connector housing via a positive and/or integrally bonded connection.

3. The connector as claimed in claim 2, wherein the connection is a latching mechanism.

4. The connector as claimed in claim 1, wherein the locking housing has at an end facing away from the first opening of the fluid duct has a radially inwardly jutting collar, which is fixed to the connector housing.

5. The connector as claimed in claim 1, wherein the annular gap tapers at least in some sections, in the longitudinal direction (L) of the fluid duct, away from the first opening.

6. The connector as claimed in claim 1, wherein an inner side of the locking housing that is facing toward the connector housing is at least in part configured such that the inner side of the locking housing tapers conically away from the first opening.

7. The connector as claimed in claim 1, wherein the connector housing is of cylindrical configuration, and the locking element is of partially annular, annular or, U-shaped configuration.

8. The connector as claimed in claim 1, wherein the locking element is a clamp which at least in part encloses the locking housing in the peripheral direction and juts with the at least one holding portion from a radial outer side into the annular gap.

9. The connector as claimed in claim 1, wherein the locking element has at least two holding portions, which are arranged evenly distributed in the peripheral direction.

10. The connector as claimed in claim 1, wherein the at least one holding portion is movable between an assembly position, in which the holding portions do not jut into the annular gap, and a locking position, in which the holding portions do not jut into the annular gap.

11. The connector as claimed in claim 1, wherein the fluid duct extends from the first opening to a second opening.

12. A connector assembly for a fluid line, comprising a connector as claimed in claim 1 and comprising a connecting branch which has a peripherally circumferential connector portion, wherein the connector portion juts into the annular gap and has at least one holding geometry, with which the at least one holding portion of the locking element cooperates and holds the connector and the connecting branch, at least in the longitudinal direction (L) of the fluid duct, relative to one another.

13. The connector assembly as claimed in claim 12, wherein a free end of the connector portion is tapered conically toward the free end, wherein an outer face of the free end of the connector portion is of tapered configuration.

14. A method for producing a connector, comprising the following steps:
   a) provision of a connector housing,
   b) provision of a locking device having a locking housing and a locking element,
   c) integrally bonded and/or positive connection of the locking housing to the connector housing, so that a peripherally circumferential annular gap, which is open to a first opening, is formed between the connector housing and the locking housing in order to receive a substantially cylindrical connecting branch,
   wherein, following the connection of the locking housing to the connector housing, on the connector housing a radially outwardly protruding seal, running in the peripheral direction around the connector housing, is arranged in the annular gap, wherein the seal is arranged in a peripherally circumferential groove.

* * * * *